W. W. AUSTIN.

STAND BOILER.

No. 9,974. Reissued Dec. 20, 1881.

Witnesses;

H. G. Manning

W. R. Marble

Inventor;

William W. Austin,

By Sylvanus Walker

Attorney

UNITED STATES PATENT OFFICE.

WILLIAM W. AUSTIN, OF LOWELL, MASSACHUSETTS.

STAND-BOILER.

SPECIFICATION forming part of Reissued Letters Patent No. 9,974, dated December 20, 1881.

Original No. 243,680 dated July 5, 1881. Application for reissue filed October 17, 1881.

*To all whom it may concern:*

Be it known that I, WILLIAM W. AUSTIN, of Lowell, in the county of Middlesex and State of Massachusetts, have invented certain new and useful Improvements in Stand-Boilers, of which the following is a specification.

My invention relates to improvements in stand-boilers generally used with ranges and stoves, in which cold water under pressure is introduced and led through pipes into a water-back, or other receiver subjected to the fire, where it becomes heated, and then is conducted through other pipes to the stand-boiler, from which it may be drawn when desired for use.

Heretofore the hot water has been led or discharged into the stand-boiler at a point in the lower portion, or not above the middle of the boiler, and caused to ascend by its own specific gravity through the body of cold water above its entrance, or has been led or discharged into the boiler in such manner that its caloric or heat has been disseminated through the contents or cold water, and thus lost for immediate use.

The object of my invention is to obtain in a stand-boiler a few gallons of very hot water, soon after a new fire is started or made in a stove or range, and in such position that it may be drawn off for immediate use, without requiring to heat nearly all the contents or cold water in the boiler before this result can be obtained.

By my invention, as soon as a new fire is made or started the hot water is discharged or admitted into the uppermost portion or near the upper head of a boiler without sensibly mixing with the body of cold water beneath, and may be drawn off at once for immediate use; and it consists, principally, in the construction and arrangement of a stand-boiler shell having a hot-water pipe entering through or near the upper head thereof adapted to discharge the hot water into the boiler-shell nearly in a horizontal plane or toward the boiler-head; and it further consists in the construction and arrangement of a stand-boiler shell having a hot-water pipe entering the shell through or near the upper head adapted to discharge or deflect the hot water as it enters the boiler nearly in a horizontal plane or toward the upper head thereof, so as to permit the hot water to be drawn off for immediate use; and it further consists in the construction and arrangement of perforated horizontal plates within a stand-boiler shell, as hereinafter more fully described, and set forth in the claims.

Figure 1:
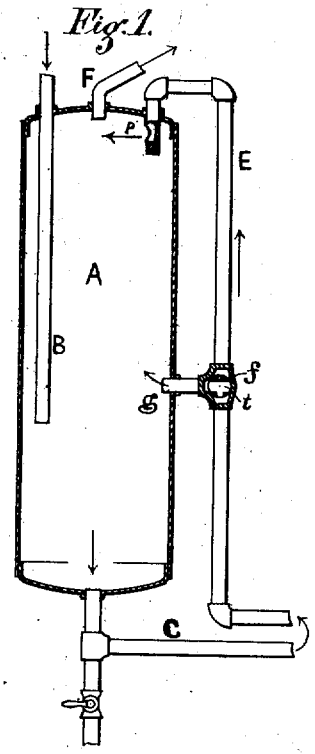
Figure 3:
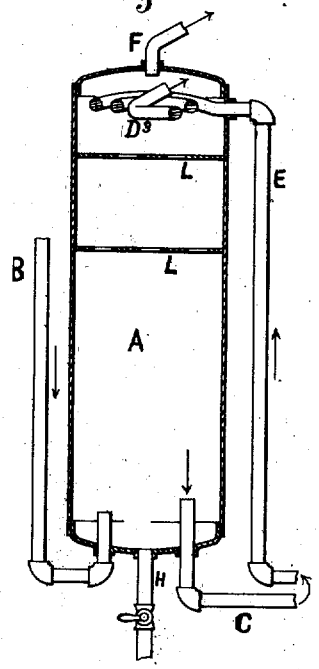
Figure 2:
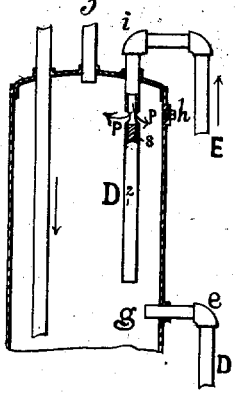

Figure 1 represents a vertical section through a stand-boiler as heretofore constructed for use and having my invention applied thereto. Fig. 2 represents a vertical section of a stand-boiler constructed according to my invention. Fig. 3 represents a vertical section of a stand-boiler constructed according to details of my invention and modifications thereof.

A represents a stand-boiler shell, having a cold-water induction-pipe, B, and a pipe, C, which conducts the cold water from the stand-boiler to a water-back or any other suitable heating chamber or device, placed in a range, stove, or other device, or means whereby the contents thereof will be heated, and a pipe, E, to conduct the heated water back into the uppermost portion of the boiler.

Heretofore the hot water has been admitted into the boiler at a point in the lower half of the boiler, as shown at *g*, Figs. 1 and 2.

My invention is such that it may be applied at little expense to stand-boilers as heretofore constructed and now in use; but this requires some modifications not required in the construction of new boilers, as hereinafter described.

In applying my invention to boilers already in use, as shown in Figs. 1 and 2, I remove the elbow *e*, (shown in Fig. 2,) usually connected with the pipe D close to the boiler, and replace it by a three-way cock, *f*, as shown in Fig. 1, and connect the upper end thereof, by means of the hot-water pipe E, with the upper end of the boiler, through the head of which it enters, the inner end of said pipe being closed or plugged up and one or more lateral openings, P, formed therein, so as to deflect the hot water and cause it to issue from said opening or openings P in a horizontal plane, or toward the upper head of the boiler, as shown in Figs. 1 and 3, whereby the hot water is discharged into the boiler, so that it may be drawn off while very hot through the pipe F, leading to a bath-tub, wash-stand, or where desired for immediate use, and before it mingles with the cold water beneath the point of entrance or discharge from the said hot-water pipe E. This addition to boilers now in use can be easily made at little expense, as the head of the boiler is generally provided with plugged openings to adapt it to various locations.

The three-way cock *f* is preferably provided with a handle pointing in the direction the water runs, and if for any reason it should become desirable to direct the hot water into the lower portion of the boiler, said cock *f* may be turned accordingly, the passage-ways leading into and off the cock being comparatively large, and the stops so arranged as to prevent the plug *t* of the cock ever closing entirely one without opening the other of the water-passages leading into the boiler.

In Fig. 2 I have shown a modification in the construction of attaching my invention to a boiler previously provided with the vertical pipe $D^2$, passing through the upper head thereof and extending downward within the interior of the boiler to about one-half or two-thirds the distance from the head to the bottom thereof, terminating in a vertical open end. This pipe $D^2$ having been soldered into the head of the boiler at the point of entrance and remaining fixed or immovable, I attach my improvement thereto by drilling a small hole through the side of the boiler at *h*, and thence into or through the said pipe $D^2$ opposite said hole *h*, forming horizontal openings P in the sides of said pipe. The elbow *i* having been removed from said pipe $D^2$, a suitable plug or cork, *s*, is forced downward into the pipe $D^2$, past the openings P, and left secure there. The hole *h* in the side of the boiler being stopped or plugged, and the pipe E being connected either with a three-way cock, as in Fig. 1, or, as in Figs. 2 and 3, directly with a water back or heater, the hot water will enter or be discharged into the boiler precisely the same as in the former construction, and may be drawn off hot for immediate use, as before described.

I will now proceed to describe the best construction of my invention as applied to new boilers, as shown in Figs. 2 and 3, and particularly in the former illustration I have shown a cheap and simple method of accomplishing the result desired.

In Fig 3 it will be seen that the cold-water pipe B is arranged to discharge the water into the boiler near the bottom, and is located outside the boiler, instead of being arranged to pass within the boiler, whereby the temperature of the heated water would be lowered. The pipe C, leading from the boiler to the heater, connects with the boiler, or has its inner open end arranged a little above the inner end of the said pipe B, so as to permit any sediment that may accumulate to remain undisturbed until drawn off through the sediment or mud discharging pipe H, which is secured to the lower head of the boiler for the purpose. The water, after passing into and through the water-back of the range or heater, is carried or conducted up through the pipe E and discharged into the boiler horizontally near the upper head, or in such manner as to be received into the uppermost portion of boiler without mingling with the cold water beneath and permit of being drawn while hot through the pipe F, as before described in the former constructions.

I further contemplate the construction and arrangement of a horizontal coil, $D^3$, within the upper portion of the boiler connecting with the inner end of the said hot-water pipe E, as shown in Fig. 3, its open inner end being provided with a deflector, or pointing in such direction as to discharge or deflect the hot water in a horizontal plane, or toward the upper head of the boiler, it being essential in all cases that the hot water should enter the boiler near the upper head, or be discharged from the hot-water pipe E, when constructed to enter the boiler at any desired point in a horizontal plane, or toward the upper head and in close proximity thereto, the object being to retard as much as possible the intermingling of the hot water with the cold water beneath. It will be seen that the coil $D^3$ tends in this direction, but may be omitted without departing from the essential feature of my invention; and in order to partially arrest and deflect the upward current of cold water entering the lower portion of the boiler or through the lower head thereof, I have secured within the boiler one or more horizontal partitions or plates, L, provided with a series of holes or openings through which water will pass, yet said plates will partially arrest and deflect the current of cold water tending upward within the boiler, the continuous flow of hot water direct from the heater keeping the water in the upper end of the boiler much the hottest.

Having thus described my invention, what I claim is—

1. A stand-boiler shell adapted to water-pressure, provided with a hot-water-exit pipe leading from its upper head and having a hot-water pipe entering through or near the upper head thereof adapted to discharge the hot water into said shell nearly in a horizontal plane or toward the boiler-head, for the purposes set forth.

2. A stand-boiler shell adapted to water-pressure, provided with a hot water-exit pipe leading from its upper head and having a hot-water pipe entering through or near the upper head thereof adapted to deflect the hot water as it enters said shell nearly in a horizontal plane, or toward the upper head, whereby the hot water may be drawn off for immediate use, substantially as described, as and for the purposes set forth.

3. A stand-boiler shell provided with one or more perforated horizontal partitions and having a hot water pipe entering through or near the upper head thereof adapted to discharge or deflect the hot water as it enters said shell nearly in a horizontal plane or toward the boiler-head, and a pipe to admit cold water entering through or near the bottom of said boiler, substantially as described, as and for the purposes set forth.

WILLIAM W. AUSTIN.

Witnesses:
SYLVENUS WALKER,
W. M. PARKER.